(12) United States Patent
Sarda-Mantri et al.

(10) Patent No.: US 9,644,135 B2
(45) Date of Patent: May 9, 2017

(54) DELAYED CURING SILANE-BASED CURABLE RESIN SYSTEM

(71) Applicant: Halliburton Energy Services, Inc., Houston, TX (US)

(72) Inventors: Anjali Ramesh Sarda-Mantri, Pune (IN); Prajakta Ratnakar Patil, Pune (IN); Shoy George Chittattukara, Thrissur (IN); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/652,190

(22) PCT Filed: Oct. 3, 2014

(86) PCT No.: PCT/US2014/058959
§ 371 (c)(1),
(2) Date: Jun. 15, 2015

(87) PCT Pub. No.: WO2016/053346
PCT Pub. Date: Apr. 7, 2016

(65) Prior Publication Data
US 2016/0280985 A1  Sep. 29, 2016

(51) Int. Cl.
*E21B 43/26* (2006.01)
*C09K 8/575* (2006.01)
*C09K 8/80* (2006.01)
*E21B 43/267* (2006.01)

(52) U.S. Cl.
CPC .......... *C09K 8/5755* (2013.01); *C09K 8/5751* (2013.01); *C09K 8/805* (2013.01); *E21B 43/26* (2013.01); *E21B 43/267* (2013.01)

(58) Field of Classification Search
None
See application file for complete search history.

(56) References Cited

U.S. PATENT DOCUMENTS

| | | | |
|---|---|---|---|
| 3,208,525 A * | 9/1965 | Caldwell | C09K 8/5086 166/286 |
| 3,316,966 A | 5/1967 | Dear | |
| 3,563,314 A * | 2/1971 | Harnsberger | C09K 8/56 166/295 |
| 4,042,032 A | 8/1977 | Anderson et al. | |
| 6,006,836 A * | 12/1999 | Chatterji | C09K 8/42 166/295 |
| 6,045,873 A | 4/2000 | Adachi et al. | |
| 7,037,958 B1 | 5/2006 | Hansen et al. | |
| 7,114,570 B2 | 10/2006 | Nguyen et al. | |
| 7,264,052 B2 | 9/2007 | Nguyen et al. | |
| 7,306,037 B2 | 12/2007 | Nguyen et al. | |
| 8,708,044 B2 | 4/2014 | Aston et al. | |
| 2005/0194137 A1 * | 9/2005 | Nguyen | C09K 8/508 166/276 |
| 2005/0274520 A1 | 12/2005 | Nguyen et al. | |
| 2010/0267593 A1 * | 10/2010 | Zhang | C09K 8/575 507/219 |
| 2013/0052355 A1 | 2/2013 | Hachikian et al. | |
| 2014/0060828 A1 * | 3/2014 | Nguyen | E21B 43/267 166/280.1 |
| 2014/0124200 A1 * | 5/2014 | Fournier | C09K 8/805 166/280.2 |

FOREIGN PATENT DOCUMENTS

WO   2009085377 A1   7/2009

OTHER PUBLICATIONS

International Search Report and Written Opinion for PCT/US2014/058959 dated May 29, 2015.

* cited by examiner

*Primary Examiner* — Angela M DiTrani
(74) *Attorney, Agent, or Firm* — McDermott Will & Emery LLP

(57) ABSTRACT

Method involving consolidation compositions comprising an aqueous-based fluid, a silane-based resin, a silane-based amine curing agent, and a delaying agent. The silane-based resin is an epoxy-functionalized alkoxysilane selected from the group consisting of: (3 glycidoxypropyl)trimethoxysilane, (3 glycidoxypropyl)triethoxysilane, 5,6 epoxyhexyltriethoxysilane, (3 glycidoxypropyl)methyldiethoxysilane, (3 glycidoxypropyl)methyldimethoxysilane, and (3 glycidoxypropyl)dimethylethoxysilane. The silane-based amine curing agent is selected from the group consisting of: a polyamine, a hydrophobically modified polyamine, a polyimine, a hydrophobically modified polyimine, a polyalcohol, a hydrophobically modified polyacrylamide, a hydrophobically modified polyacrylate, and any combination thereof. The delaying agent is selected from the group consisting of: methyltrichlorosilane, dimethyldichlorosilane, trimethylchlorosilane, and any combination thereof.

20 Claims, 1 Drawing Sheet

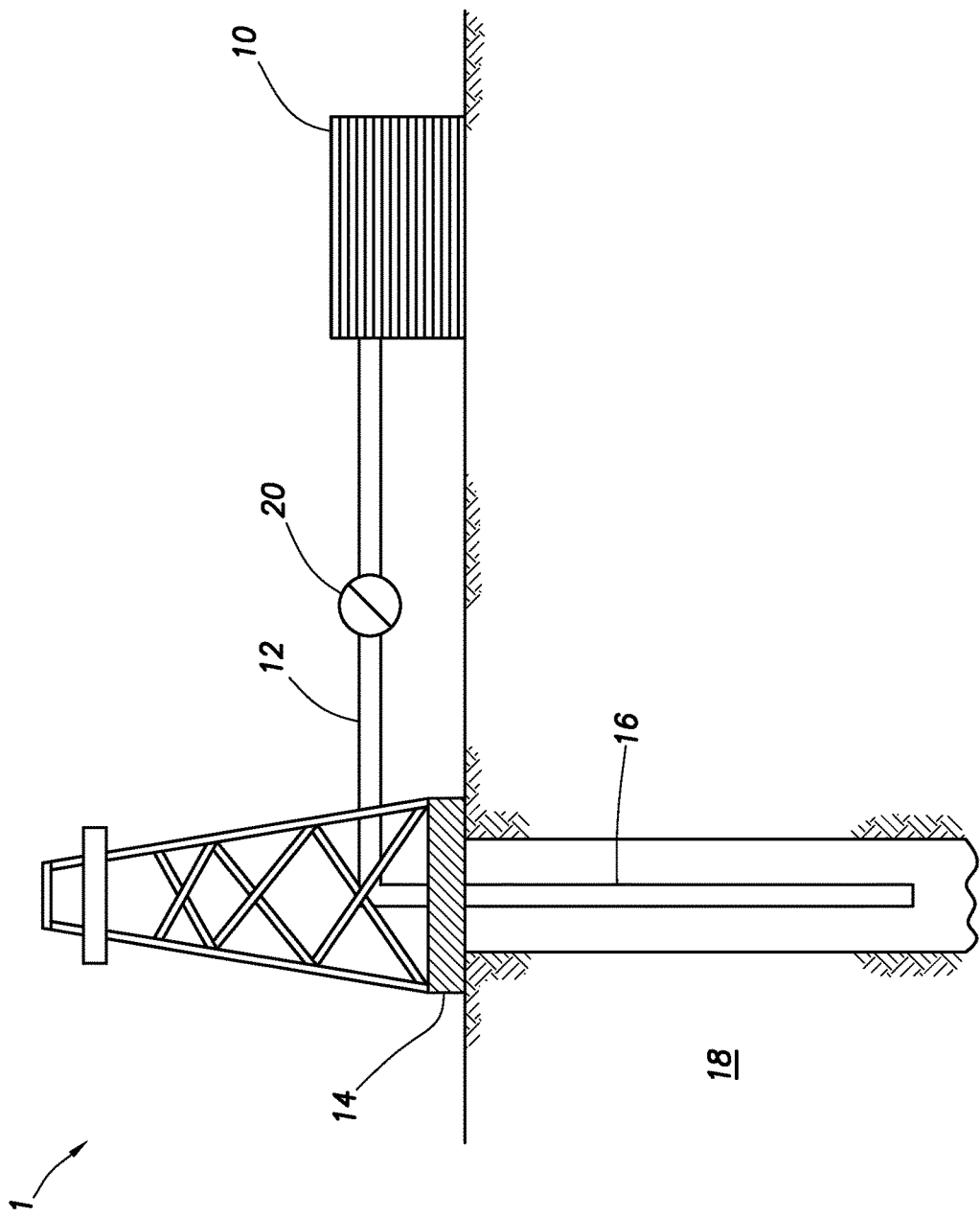

DELAYED CURING SILANE-BASED CURABLE RESIN SYSTEM

BACKGROUND

The embodiments herein relate to consolidation compositions for use in subterranean formation operations.

Subterranean wells are often stimulated by hydraulic fracturing treatments. In hydraulic fracturing treatments, a viscous treatment fluid may be pumped into a portion of a subterranean formation at a rate and pressure such that the subterranean formation breaks down and one or more fractures are formed. Typically, particulate solids, such as graded sand, are introduced into the subterranean formation in a portion of the treatment fluid and deposited into the fracture. These particulate solids, (generally known as "proppant particulates" or, simply, "proppant") serve to prop the fracture open (e.g., keep the fracture from fully closing) after the hydraulic pressure is removed. By keeping the fracture from fully closing, the proppants aid in forming conductive paths through which produced fluids, such as hydrocarbons, may flow. The process of fracturing often creates unconsolidated particulates within the formation as the formation rock is fractured and any proppant not confined to the fracture may undesirably migrate within the formation.

Thus, subterranean formations surrounding wellbores and fractures often contain unconsolidated particulates, whether naturally occurring, placed during an operation, or created during an operation. The unconsolidated particulates may migrate out of the subterranean formation and be produced with production fluids. The presence of unconsolidated particulates in a formation during production is undesirable at least because they may damage or abrade producing equipment or reduce well production. For example, unconsolidated particulates may migrate into wellbore casings, perforations, or the interstitial spaces between packed proppants within a fracture and clog or hinder well production. As used herein, the term "unconsolidated particulates" refers to any loose or loosely bonded particulates that may move through the formation with wellbore fluids (e.g., production fluids). Unconsolidated particulates may include, for example, sand, gravel, proppant particulates, and/or formation fines.

One method of controlling unconsolidated particulates in subterranean formations is to perform a gravel-packing treatment. In gravel-packing treatments, particulates are deposited into unconsolidated or weakly consolidated formation zones to create a physical barrier to the transport of unconsolidated particulates with produced fluids. Typical gravel-packing treatments include placing a screen in a wellbore and packing the annulus between the screen and the wellbore with particulates of a certain size to prevent the transport of unconsolidated particulates with the produced fluids without compromising the conductivity of the well. Gravel-packing treatments, however, involve placement of additional unconsolidated particulates into the wellbore which may not be adequately maintained, for example, by a screen and which may, therefore, migrate along with the produced fluids.

Another method of controlling unconsolidated particulates is to treat the wellbore with a consolidating agent. In such treatments, a consolidating agent is placed into the wellbore in order to stabilize unconsolidated particulates, such as by contacting unconsolidated particulates and curing into a hardened mass. Typically, the consolidating agent may be used to lock unconsolidated particulates in place and form at least a partially immobilized substance, which may be accomplished by enhancing grain-to-grain or grain-to-formation contact of the unconsolidated particulates.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the consolidation compositions of the embodiments described herein to a downhole location.

DETAILED DESCRIPTION

The embodiments herein relate to consolidation compositions for use in subterranean formation operations. Specifically, the embodiments herein provide novel consolidation compositions and methods for treating unconsolidated particulates in a subterranean formation wherein the consolidation composition is capable of internally delaying the curing process. In some embodiments, the consolidation composition may comprise a three-component system of a silane-based resin, a silane-based amine curing agent, and a delaying agent capable of temporarily protecting the amine to delay curing. The three-component system is proved in an aqueous-based fluid. In solution, the relative amounts of the three-component system are about 0.1-7.5% of a silane-based resin, about 0.05-5% of a silane-based amine curing agent, and about 0.04-2% of a delaying agent; wherein the percentages are by volume of the component to volume of the aqueous based fluid, that is "v/v %." Put another way, when considered as v/v % as a three component system alone, the system may comprise about 1-99 v/v % silane-based resin, about 30-95 v/v % silane-based amine curing agent, and about 1-90 v/v % delaying agent.

Although some embodiments described herein are illustrated by reference to hydraulic stimulation treatments, the consolidation compositions disclosed herein may be used in any subterranean formation operation that may benefit from consolidation of particulates. Such treatment operations may include, but are not limited to, a drilling operation; a stimulation operation; an acidizing operation; an acid-fracturing operation; a sand control operation; a completion operation; a scale inhibiting operation; a water-blocking operation; a clay stabilizer operation; a fracturing operation; a frac-packing operation; a gravel packing operation; a wellbore strengthening operation; a sag control operation; a remedial operation; a near-wellbore consolidation operation; a plug and abandonment operation; and any combination thereof. By way of example, many consolidating treatments are performed at matrix flow rates. As used herein, the term "matrix flow rates" refers to a fluid rate such that the pressure exerted on the formation is less than that formation's fracturing pressure.

Moreover, the consolidation compositions described herein may be used in any non-subterranean operation that may benefit from their consolidation. Such operations may be performed in any industry including, but not limited to, oil and gas, mining, chemical, pulp and paper, aerospace, medical, automotive, and the like.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

Some embodiments described herein include a method of providing a consolidation composition comprising the reaction product of a silane-based resin and a silane-based amine curing agent; wherein the reaction is delayed due to the presence of a delaying agent capable of temporarily protecting the silane-based amine curing agent such that it is not available to reaction with the silane-based resin.

In some embodiment the consolidation composition may be coated onto proppant particulates that are then introduced into a subterranean formation and placed into a fracture therein, where the consolidation composition cures and consolidates the coated proppant particulates in the fracture to form a proppant pack therein. As used herein, the term "proppant pack" refers to a collection of a mass of proppant particulates within a fracture or open space in a subterranean formation.

In some embodiments, proppant particulates may be coated prior to introducing them into the subterranean formation (i.e., forming coated proppant particulates before introducing them into the formation). In other embodiments, the proppant particulates may be coated with the consolidation composition on-the-fly simultaneously as the proppant particulates are introduced into the subterranean formation by placing the proppant particulates and the consolidation composition into a treatment fluid and allowing the proppant particulates to become coated with the consolidation composition as the treatment fluid is introduced into the subterranean formation. As used herein, the term "on-the-fly" refers to performing an operation during a subterranean treatment that does not require stopping normal operations. In some embodiments, the treatment fluid comprising the consolidation compositions and/or proppant particulates coated or to be coated with the consolidation compositions described herein may be introduced into the subterranean formation at a rate and pressure sufficient to create or enhance the fracture.

Some embodiments herein provide a method of providing a portion of a subterranean formation comprising unconsolidated particulates and introducing the consolidation compositions described herein into the subterranean formation to contact the unconsolidated particulates with the consolidation composition and coat the unconsolidated particulates. The consolidation composition is then cured to consolidate the unconsolidated particulates. In some embodiments, the unconsolidated particulates may comprise proppant particulates in a proppant pack in a fracture in the subterranean formation.

In some embodiments, the components of the consolidation compositions described herein may be introduced separately into the subterranean formation. However, in order to experience the beneficial delayed curing the silane-based resin and silane-based amine curing agent should not be added together without the presence of the delaying agent. It may be desirable, rather than placing all three components at once, to place the silane-based resin first and then to follow with a fluid that includes both the silane-based amine curing agent and the delaying agent, such that the reactive amine group on the silane-based amine curing agent is protected and not available to cure the silane-based resin.

The consolidation compositions and/or coated proppant particulates may be introduced into a subterranean formation as a pill. As used herein, the term "pill" refers to a relatively small volume of a specially prepared fluid for use in a subterranean formation operation.

Suitable silane-based resins comprise a compound containing an epoxy group and a silicon atom having at least one direct oxygen attachment. Such suitable silane-based resins are epoxy-functionalized alkoxysilanes that include:

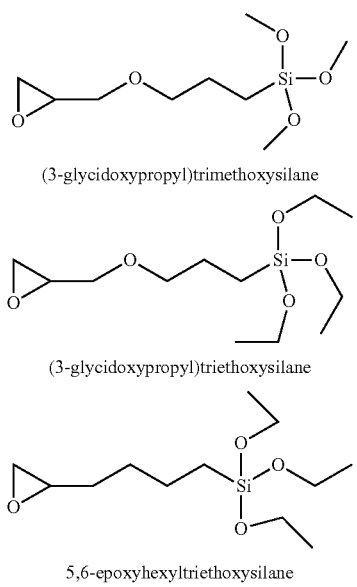

(3-glycidoxypropyl)trimethoxysilane (3-glycidoxypropyl)triethoxysilane 5,6-epoxyhexyltriethoxysilane (3-glycidoxypropyl)methyldiethoxysilane (3-glycidoxypropyl)methyldimethoxysilane (3-glycidoxypropyl)dimethylethoxysilane Derivatives of the above may also be suitable. As used herein, the term "derivative" refers to any compound that is made from one of the listed compounds, for example, by replacing one atom in one of the listed compounds with another atom or group of atoms, ionizing one of the listed compounds, or creating a salt of one of the listed compounds. In some embodiments, the silane-based resin may be present in the aqueous treatment fluid in a range of from a lower limit of about 0.1%, to an upper limit of about 7.5% by volume of the aqueous treatment fluid.

Suitable silane-based amine curing agents comprise silicon-containing compounds with reactive amine groups. Such suitable amine curing agents include: N-[3-(trimethoxysilyl)propyl]ethylenediamine, 3-aminopropyltriethoxysilane, 3-aminopropyltrimethoxysilane, 4-aminobutyltriethoxysilane, aminophenyltrimethoxysilane, 3-aminopropyltris(methoxyethoxy-ethoxy)silane, 11-aminodecyltriethoxysilane, 2-(4-pyridylethyl)triethoxysilane, 3-aminopropyl diisopropylethoxysllane, 3-aminopropyl dimethylethoxysilane, N-(2-amlnoethyl)-3-aminopropyl-triethoxysilane, N-(6-aminohexyl)aminomethyl-triethoxysllane, N-(6-aminohexyl)aminopropyl-trimethoxysilane, (3-trimethoxysilylpropyl)diethylene triamlne, N-butylaminopropyltrimethoxysilane, bis(2-hydroxyethyl)-3-amlnopropyl-triethoxysllane, and 3-(N-styrylmethyl-2-aminoethylamino)propyltrimethoxysilane hydrochloride. Derivatives of the above may also be suitable. In some embodiments, the silane-based amine curing agent may be present in the range of from a lower limit of about 0.05%, to an upper limit of about 5% by volume of the aqueous treatment fluid.

Suitable delaying agents capable of temporarily protecting the amine to delay curing include trimethylchlorosilane, dimethyidichlorosilane, methyltrichlorosilane, and combinations thereof. Derivatives of the above may also be suitable. In some embodiments, the delaying agent may be present in the range of from a lower limit of about 0.04%, to an upper limit of about 2% by volume of the aqueous treatment fluid.

While not wishing to be limited by theory, taking as an example (3-glycidoxypropyl)trimethoxysilane (GPTMS) as the silane-based resin and N-[3-(trimethoxysilyl)propyl]ethylenediamine (TMSPED) as the silane-based amine curing agent, the following is the expected reaction, Reaction A:

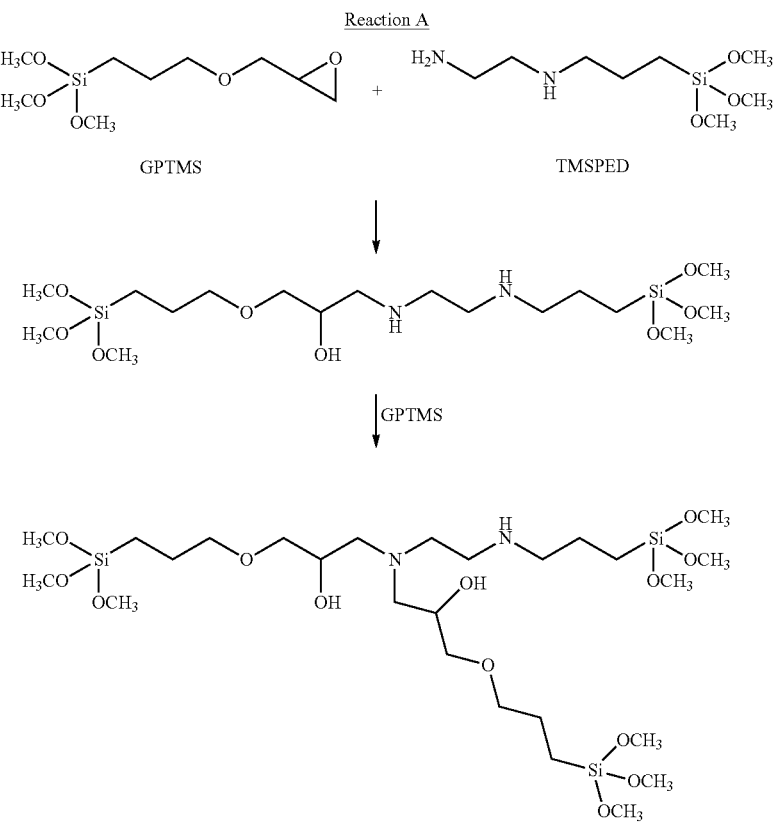

The consolidation compositions described herein may comprise a silane-based resin, a liquid, a silane-based amine curing agent, and a delaying agent capable of temporarily protecting the amine to delay curing. For the present invention, both the silicon on the silane-based resin and the silicon on the silane-based amine curing agent may act to aid in securing the resin to sand surfaces on a proppant or formation fines and surfaces. The consolidation compositions described herein may cure to form a cohesive, flexible, and potentially permeable mass that immobilizes particulates (e.g., proppant particulates and/or unconsolidated particulates). While not wishing to be limited by theory, the below reactions show how the silane-based resin, and the silane-based amine curing agent may aid in securing the resin to proppant or formation surfaces, taking the reaction product from above:

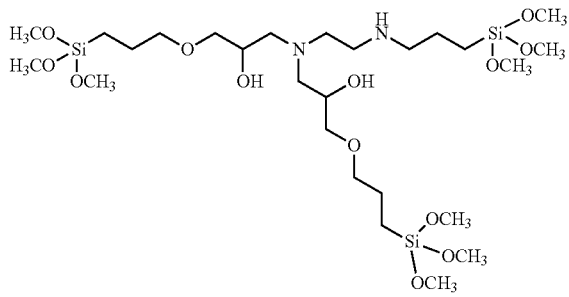 [SMILES: CO[Si](CCCNCCN(CC(O)COCCC[Si](OC)(OC)OC)CC(O)COCCC[Si](OC)(OC)OC)(OC)OC]

And showing its relation to a silica surface:

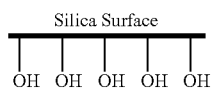

The final reaction product is capable of bonding to a silica surface at three areas over nine potential sites:

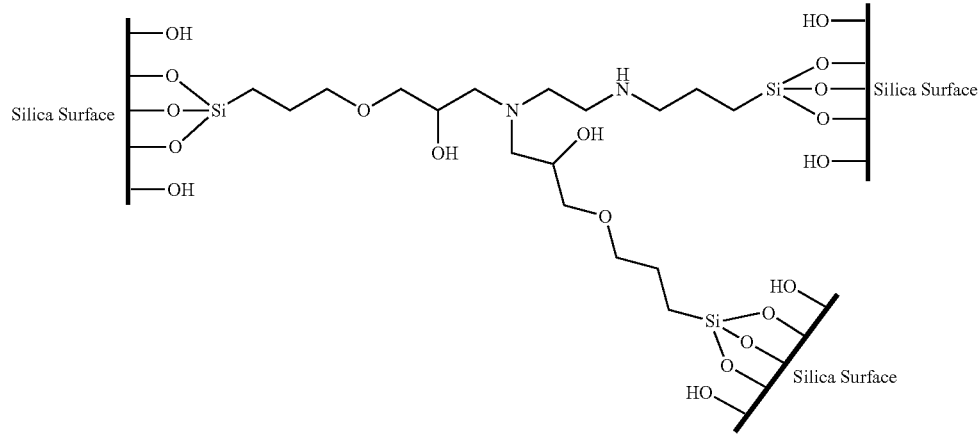

Thus, the delayed curing resins of the present invention are particularly well-suited for use in consolidating formation sands, proppant, and other silica-containing surfaces.

Regarding the reaction of delay, a suitable delaying agent, such as trimethylchlorosilane, dimethyldichlorosilane, methyltrichlorosilane, or combinations thereof, may be used to preferentially, and reversibly, react with the silane-based amine curing agent. The protection reaction may be reversed with the addition of heat in the presence of an alkaline fluid to produce hydrolysis. Again, not wishing to be limited by theory and using N-[3-(trimethoxysilyl)propyl]ethylenediamine (TMSPED) as the silane-based amine curing agent, the protection reaction may be shown as follows:

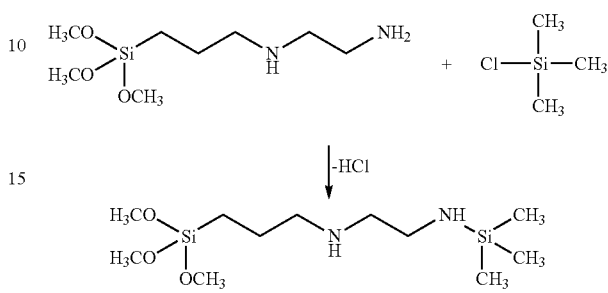

When exposed to heat and over time the process is reversed as to the silane-based amine curing agent. The reversal process may be accelerated under alkaline conditions, such as by flushing with a sodium bicarbonate solution, as shown in the reaction below:

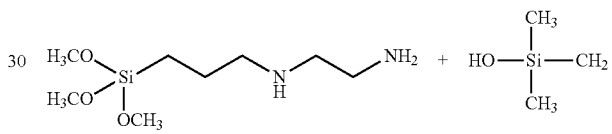

Alkaline agents suitable for use in the present invention to make the amine site on the silane-based amine curing agent available to cure the silane-based resin include sodium bicarbonate, sodium hydroxide, or combinations thereof. Where used, the alkaline agents are generally present in an aqueous based fluid in an amount of from about 0.1% to about 5% by weight of the aqueous based fluid. Because the protection function is reversed in the presence of an alkaline solution, when placing the three-component system of the present invention, a preferred treatment fluid is non-alkaline.

Suitable aqueous-based treatment fluids suitable for use herein may include, but are not limited to, fresh water; saltwater (e.g., water containing one or more salts dissolved therein); brine (e.g., saturated saltwater); seawater; and any combination thereof. Such fluids may be used as the base for a preflush fluid, a postflush fluid, or a treatment fluid containing one or more components of the three-component consolidation composition. In some preferred embodiments the aqueous fluid contains a salt such as sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate, and any combination thereof. Generally, the aqueous portion (i.e., the water) of the treatment fluids described herein may be from any source, provided that it does not contain components that might adversely affect the stability and/or performance of the treatment fluids described herein.

In some embodiments wherein portions of a formation are to be consolidated, first a preflush is placed into the portion of the formation to prepare for the consolidating treatment. Preferably, the preflush comprises a surfactant to remove debris, and/or oil residue and the preflush may further comprise a clay stabilizer in formations where clay swelling or movement is of concern. Next, the three component resin system is placed into the portion of the subterranean formation to coat the surfaces therein. Finally, an aqueous postflush solution may be placed into the area where the three component resin system was placed. Postflush fluids may be used as simple aqueous fluids to clean the interstitial spaces or may serve multiple purposes by including an optional clay stabilizer and/or an optional alkaline agent to accelerate the curing of the silane-based resin.

Some suitable clay stabilizers include salts of inorganic and organic acids. Examples of suitable salts of inorganic acids include, but are not limited to, sodium chloride, calcium chloride, potassium chloride, sodium bromide, calcium bromide, potassium bromide, sodium sulfate, calcium sulfate, sodium phosphate, calcium phosphate, sodium nitrate, calcium nitrate, cesium chloride, cesium sulfate, cesium phosphate, cesium nitrate, cesium bromide, potassium sulfate, potassium phosphate, potassium nitrate, and the like. Examples of suitable organic acids include, but are not limited to, sodium acetate, sodium formate, calcium acetate, calcium formate, cesium acetate, cesium formate, potassium acetate, potassium formate, magnesium acetate, magnesium formate, zinc acetate, zinc formate, antimony acetate, antimony formate, bismuth acetate, and bismuth formate. Other suitable clay stabilizers include polymers and resins known in the art that are suitable for use in subterranean operations. Examples of polymers and resins suitable for use in the present invention include, but are not limited to: acrylic acid polymers; acrylic acid ester polymers; acrylic acid derivative polymers; acrylic acid homopolymers; acrylic acid ester homopolymers (such as poly(methyl acrylate), poly(butyl acrylate), and poly(2-ethylhexyl acrylate)); acrylic acid ester co-polymers; methacrylic acid derivative polymers; methacrylic acid homopolymers; methacrylic acid ester homopolymers (such as poly(methyl methacrylate), poly(butyl methacrylate), and poly(2-ethylhexyl methacrylate)); acrylamido-methyl-propane sulfonate polymers; acrylamido-methyl-propane sulfonate derivative polymers; acrylamido-methyl-propane sulfonate co-polymers; acrylic acid/acrylamido-methyl-propane sulfonate co-polymers; bisphenol A diglycidyl ether resins; butoxymethyl butyl glycidyl ether resins; bisphenol A-epichlorohydrin resins; bisphenol F resins; polyepoxide resins; novolak resins; polyester resins; phenol-aldehyde resins; urea-aldehyde resins; furan resins; urethane resins; glycidyl ether resins; epoxide resins; polyacrylamide; partially hydrolyzed polyacrylamide; copolymers of acrylamide and acrylate; carboxylate-containing terpolymers; tetrapolymers of acrylate; galactose; mannose; glucoside; glucose; xylose; arabinose; fructose; glucuronic acid; pyranosyl sulfate; guar gum; locust bean gum; tara; konjak; tamarind; starch; cellulose; karaya; xanthan; tragacanth; carrageenan; polycarboxylates such as polyacrylates and polymethacrylates; polyacrylamides; methylvinyl ether polymers; polyvinyl alcohols; polyvinylpyrrolidone; CLA-STA® XP, a water-soluble cationic oligomer (available from Halliburton Energy Services in Duncan, Okla.); CLA-STA® FS, a polymer (available from Halliburton Energy Services in Duncan, Okla.); and CLA-WEB®, a stabilizing additive (available from Halliburton Energy Services in Duncan, Okla.); and combinations thereof.

In some embodiments, the three-component consolidation systems may further comprise a surfactant; a hydrolysable ester; a solvent; and any combination thereof. A surfactant may be used in the consolidation compositions described herein to facilitate coating of the consolidation composition onto a suitable substrate (e.g., proppant particulates and/or unconsolidated particulates). Any surfactant compatible with the consolidation compositions described herein may be used. Suitable surfactants may include, but are not limited to, an alkyl phosphonate surfactant (e.g., a $C_{12}$-$C_{22}$ alkyl phosphonate surfactant); an ethoxylated nonyl phenol phosphate ester; one or more cationic surfactants; and one or more nonionic surfactants; and any combination thereof. The surfactant or surfactants that may be used in the consolidation composition agent may be present in an amount in the range of a lower limit of about 1%, 1.5%, 2%, 2.5%, 3%, 3.5%, 4%, 4.5%, and 5% to an upper limit of about 10%, 9.5%, 9%, 8.5%, 8%, 7.5%, 7%, 6.5%, 6%, 5.5%, and 5% by weight of the consolidation composition.

A hydrolysable ester may be included in the consolidation compositions of the embodiments described herein to increase the porosity or permeability of a cured consolidation composition comprising proppant particulates or unconsolidated particulates because the hydrolysable ester will dissolve or otherwise become removed under certain conditions (e.g., after the elapse of certain time or under certain temperature conditions). Suitable examples of hydrolysable esters that may be used in the consolidation compositions may include, but are not limited to, dimethylglutarate; dimethyladipate; dimethylsuccinate; sorbitol; catechol; dimethylthiolate; methyl salicylate; dimethyl salicylate; dimethylsuccinate; ter-butylhydroperoxide; butyl lactate; and any combination thereof. When used, a hydrolysable ester may be included in the consolidation compositions in an amount in the range of a lower limit of about 0.1%, 0.25%, 0.5%, 1%, 1.25%, and 1.5% to an upper limit of about 3%, 2.75%, 2.5%, 2.25%, 2%, 1.75%, and 1.5% by weight of the consolidation composition. In some embodiments, a hydrolysable ester may be included in the consolidation composition in an amount in the range of about 1% to about 2.5% by weight of the consolidation composition.

In some embodiments, the treatment fluids comprising the consolidation compositions and/or the consolidation compositions themselves may additionally be foamed when they are introduced into the formation without the presence of proppant particulates. In other embodiments, when the treatment fluid comprises proppant particulates coated with the consolidation compositions described herein, the treatment fluids may be foamed, gelled, or both gelled and foamed.

The consolidation composition itself, the treatment fluids comprising the consolidation composition without proppant particulates, and/or the treatment fluids comprising the consolidation composition coated onto proppant particulates may be foamed by including a gas and a foaming agent. As used herein, the term "foam" refers to a two-phase composition having a continuous liquid or solid phase and a discontinuous gas phase. Suitable gases for use in foaming the consolidation compositions or the treatment fluids described herein may include, but are not limited to, nitrogen; carbon dioxide; air; methane; helium; argon; and any combination thereof. One skilled in the art, with the benefit of this disclosure, will understand the benefit of each gas. By way of nonlimiting example, carbon dioxide foams may have deeper well capability than nitrogen foams because carbon dioxide foams have greater density than nitrogen gas foams so that the surface pumping pressure required to reach a corresponding depth is lower with carbon dioxide than with nitrogen.

In some embodiments, the gas may be present such that the consolidation composition or the treatment fluid exhibits a foam quality in the range from a lower limit of about 5%, 10%, 25%, 40%, 50%, 60%, or 70% gas volume to an upper limit of about 95%, 90%, 80%, 75%, 60%, or 50% gas volume, and wherein the foam quality of the consolidation composition or the treatment fluid may range from any lower limit to any upper limit and encompass any subset therebetween. Most preferably, the consolidation composition or the treatment fluid may have a foam quality from about 85% to about 95%, or about 90% to about 95%.

Suitable foaming agents for use in the embodiments described herein may include, but are not limited to, cationic foaming agents; anionic foaming agents; amphoteric foaming agents; nonionic foaming agents; or any combination thereof. Nonlimiting examples of suitable foaming agents may include, but are not limited to, surfactants like betaines; sulfated alkoxylates; sulfonated alkoxylates; alkyl quaternary amines; alkoxylated linear alcohols; alkyl sulfonates; alkyl aryl sulfonates; C10-C20 alkyldiphenyl ether sulfonates; polyethylene glycols; ethers of alkylated phenol; sodium dodecylsulfate; alpha olefin sulfonates (e.g., sodium dodecane sulfonate, trimethyl hexadecyl ammonium bromide, and the like); any derivative thereof; or any combination thereof. Foaming agents may be included at concentrations ranging from a lower limit of about 0.05%, 0.075%, 0.1%, 0.25%, 0.5%, and 0.75% to an upper limit of about 2%, 1.75%, 1.5%, 1.25%, 1%, and 0.075% by weight of the consolidation composition or the treatment fluid.

In some embodiments, the treatment fluids comprising the consolidation compositions may further comprise an additive including, but not limited to, a weighting agent; a fluid loss control agent; an emulsifier; a dispersion aid; a corrosion inhibitor; a lost circulation material; a pH control additive; a biocide; a stabilizing agent; a chelating agent; a scale inhibitor; a mutual solvent; an oxidizer; a reducer; a friction reducer; a clay stabilizing agent; a breaker; and any combinations thereof.

Suitable proppant particulates for use according to the methods disclosed herein (e.g., that may be coated using the consolidation compositions described herein and that may form proppant packs in fractures) may comprise any material suitable for use in a subterranean operation and may include, but are not limited to, sand; bauxite; ceramic materials; glass materials; polymer materials; polytetrafluoroethylene materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; and any combination thereof. Suitable composite particulates may comprise a binder and a filler material wherein suitable filler materials may include, but are not limited to, silica; alumina; fumed carbon; carbon black; graphite; mica; titanium dioxide; meta-silicate; calcium silicate; kaolin; talc; zirconia; boron; fly ash; hollow glass microspheres; solid glass; and any combination thereof. The mean size of the proppant particulates generally may range from about 2 mesh to about 400 mesh on the U.S. Sieve Series, or even higher; however, in certain circumstances, other mean sizes may be desired and will be entirely suitable for practice of the present invention. In particular embodiments, the mean size distribution of the proppant particulates ranges are one or more of 6/12, 8/16, 12/20, 16/30, 20/40, 30/50, 40/60, 40/70, or 50/70 mesh. It should be understood that the term "proppant particulate" or "particulate," as used in this disclosure, includes all known shapes of materials, including substantially spherical materials; fibrous materials; polygonal materials (e.g., cubic materials); and any combination thereof. Moreover, fibrous materials may be included in certain embodiments of the present invention. In certain embodiments, the proppant particulates may be present in the treatment fluid in an amount in the range of from a lower limit of about 0.5 pounds per gallon ("ppg"), 1 ppg, 5 ppg, 10 ppg, and 15 ppg to an upper limit of about 30 ppg, 25 ppg, 20 ppg, and 15 ppg by volume of the treatment fluid.

In some embodiments, degradable particulates may comprise a portion of the proppant particulates such that they intermix with proppant particulates and form a portion of the proppant pack. Upon a triggering event, the degradable particulates may be degraded, leaving behind spaces in the proppant pack that may enhance the conductivity of a propped fracture. It may be desirable that the degradable particulates have similar particle size, shape, and specific gravity as those of the proppant particulates. Suitable degradable particulates may include, but are not limited to, oil-degradable polymers; degradable polymers; degradable salts; blends thereof; and any combinations thereof. In some embodiments, degradable particulates may be included in the treatment fluids from a lower limit of about 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, and 10% to an upper limit of about 20%, 19.5%, 19%, 18.5%, 18%, 17.5%, 17%, 16.5%, 16%, 15.5%, 15%, 14.5%, 14%, 13.5%, 13%, 12.5%, 12%, 11.5%, 11%, 10.5%, and 10% by weight of the proppant particulates. In some embodiments, degradable particulates may be included in the treatment fluids from about 5% to about 15% by weight of the proppant particulates. One of ordinary skill in the art, with the benefit of this disclosure, will recognize whether to include degradable particulates and in what concentration to achieve the desired results.

In various embodiments, systems configured for delivering the treatment fluids described herein to a downhole location are described. In various embodiments, the systems can comprise a pump fluidly coupled to a tubular, the tubular containing a treatment fluid comprising a consolidation composition comprising the reaction product of a silane-based resin and a silane-based amine curing agent; wherein the reaction is delayed due to the presence of a delaying agent capable of temporarily protecting the silane-based amine curing agent such that it is not available to reaction with the silane-based resin.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the present invention to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the present invention may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. In some instances, tubular 16 may have a plurality of orifices (not shown) through which the treatment fluid of the present disclosure may enter the wellbore proximal to a portion of the subterranean formation 18 to be treated. In some instances, the wellbore may further comprise equipment or tools (not shown) for zonal isolation of a portion of the subterranean formation 18 to be treated.

Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include: Embodiments A, B, and C.

Embodiment A: A method comprising: injecting an aqueous preflush comprising a first aqueous base fluid, a clay stabilizer, and a surfactant into a portion of a subterranean formation at matrix flow rates; providing a consolidation composition comprising a second aqueous-based fluid, a silane-based resin, a silane-based amine curing agent, and a delaying agent, wherein the silane-based resin is an epoxy-functionalized alkoxysilane selected from the group consisting of: (3 glycidoxypropyl)trimethoxysilane, (3 glycidoxypropyl)triethoxysilane, 5,6 epoxyhexyltriethoxysilane, (3 glycidoxypropyl)methyldiethoxysilane, (3 glycidoxypropyl)methyldimethoxysilane, and (3 glycidoxypropyl)dimethylethoxysilane, wherein the silane-based amine curing agent is selected from the group consisting of: a polyamine, a hydrophobically modified polyamine, a polyimine, a hydrophobically modified polyimine, a polyalcohol, a hydrophobically modified polyacrylamide, a hydrophobically modified polyacrylate, and any combination thereof; wherein the delaying agent is selected from the group consisting of: methyltrichlorosilane, dimethyldichlorosilane, trimethylchlorosilane, and any combination thereof; injecting the consolidation composition into the portion of a subterranean formation at matrix flow rates; injecting an aqueous postflush fluid comprising a third aqueous base fluid and an alkaline agent into the portion of a subterranean formation at matrix flow rates; curing the consolidation composition so as to consolidate the coated proppant particulates in the fracture and form a proppant pack therein.

Embodiment A may be combined with any of the following elements in any combination:

Element A1: The method wherein the alkaline agent comprises a material selected from the group consisting of sodium bicarbonate, sodium hydroxide, and combinations thereof.

Element A2: The method wherein the alkaline agent is present in the aqueous postflush fluid in an amount of from about 0.1 w/w % to about 5 w/w % by weight of the third aqueous base fluid.

Element A3: The method wherein the silane-based resin is present in the consolidation composition in an amount of from about 0.1 v/v % to about 7.5 v/v % by volume of the second aqueous-based fluid.

Element A4: The method wherein the silane-based amine curing agent is present in the consolidation composition in an amount of from about 0.05 v/v % to about 5 v/v % by volume of the second aqueous-based fluid.

Element A5: The method wherein the delaying agent is present in the consolidation composition in an amount of from about 0.04 v/v % to about 2 v/v % by volume of the second aqueous-based fluid.

By way of example, Embodiment A may include multiple elements such as: Embodiment A with elements A1, and A2; Embodiment A with elements A2, A3, and A5; Embodiment A with elements A1, A2, A3, A4, and A5; Embodiment A with elements A2, A3, and A4; etc.

Embodiment B: A method comprising: providing a consolidation composition comprising a first aqueous-based fluid, a silane-based resin, a silane-based amine curing agent, and a delaying agent, wherein the silane-based resin is an epoxy-functionalized alkoxysilane selected from the group consisting of: (3 glycidoxypropyl)trimethoxysilane, (3 glycidoxypropyl)triethoxysilane, 5,6 epoxyhexyltriethoxysilane, (3 glycidoxypropyl)methyldiethoxysilane, (3 glycidoxypropyl)methyldimethoxysilane, and (3 glycidoxypropyl)dimethylethoxysilane, wherein the liquid curing agent is selected from the group consisting of: a polyamine; a hydrophobically modified polyamine; a polyimine; a hydrophobically modified polyimine; a polyalcohol; a hydrophobically modified polyacrylamide; a hydrophobically modified polyacrylate; and any combination thereof; wherein the delaying agent is selected from the group consisting of: methyltrichlorosilane, dimethyldichlorosilane, trimethylchlorosilane, and any combination thereof; injecting the consolidation composition comprising a silane-based resin into the portion of a subterranean formation at matrix flow rates.

Embodiment B may be combined with any of the following elements in any combination:

Element B1: The method further comprising injecting an alkaline agent at matrix flow rates into the proportion of the subterranean formation after injecting the consolidation composition comprising a silane-based resin into the portion of a subterranean formation.

Element B2: The method wherein the alkaline agent comprises a material selected from the group consisting of m bicarbonate, sodium hydroxide, and combinations thereof.

Element B3: The method wherein the alkaline agent is present in the aqueous postflush fluid in an amount of from about 0.1 w/w % to about 5 w/w % by weight of the third aqueous base fluid.

Element B4: The method wherein the silane-based resin is present in the consolidation composition in an amount of from about 0.1 v/v % to about 7.5 v/v % by volume of the second aqueous-based fluid.

Element B5: The method wherein the silane-based amine curing agent is present in the consolidation composition in an amount of from about 0.05 v/v % to about 5 v/v % by volume of the second aqueous-based fluid.

Element B6: The method wherein the delaying agent is present in the consolidation composition in an amount of from about 0.04 v/v % to about 2 v/v % by volume of the second aqueous-based fluid.

By way of example, Embodiment B may include multiple elements such as: Embodiment B with elements B1, and B2; Embodiment B with elements B1 and B3; Embodiment B with elements B1, B2, B3, B4, B5, and B6; Embodiment B with elements B1, B2, and B3; Embodiment B with elements B1, B2, B3, and B6; etc.

Embodiment C: A method comprising: providing proppant particulates; providing a consolidation composition comprising a first aqueous-based fluid, a silane-based resin, a silane-based amine curing agent, and a delaying agent, wherein the silane-based resin is an epoxy-functionalized alkoxysilane selected from the group consisting of: (3 glycidoxypropyl)trimethoxysilane, (3 glycidoxypropyl)triethoxysilane, 5,6 epoxyhexyltriethoxysilane, (3 glycidoxypropyl)methyldiethoxysilane, (3 glycidoxypropyl)methyldimethoxysilane, and (3 glycidoxypropyl)dimethylethoxysilane, wherein the liquid curing agent is selected from the group consisting of: a polyamine; a hydrophobically modified polyamine; a polyimine; a hydrophobically modified polyimine; a polyalcohol; a hydrophobically modified polyacrylamide; a hydrophobically modified polyacrylate; and any combination thereof; therein the delaying agent is selected from the group consisting of: methyltrichlorosilane, dimethyldichlorosilane, trimethylchlorosilane, and any combination thereof; coating the proppant particulates with the consolidation composition, thereby creating coated proppant particulates; introducing the coated proppant particulates into a subterranean formation and placing the coated proppant particulates into a fracture therein; and; curing the consolidation composition so as to consolidate the coated proppant particulates in the fracture and form a proppant pack therein.

Embodiment C may be combined with any of the following elements in any combination:

Element C1: The method wherein the step of curing the consolidation composition is performed by washing an aqueous postflush comprising an aqueous base fluid and an alkaline agent across the coated unconsolidated particulates.

Element C2: The method wherein the alkaline agent comprises a material selected from the group consisting of sodium bicarbonate, sodium hydroxide, and combinations thereof.

Element C3: The method wherein the alkaline agent is present in the aqueous postflush fluid in an amount of from about 0.1 w/w % to about 5 w/w % by weight of the aqueous postflush fluid.

Element C4: The method wherein the silane-based resin is present in the consolidation composition in an amount of from about 0.1 v/v % to about 7.5 v/v % by volume of the first aqueous-based fluid.

Element C5: The method wherein the silane-based amine curing agent is present in the consolidation composition in an amount of from about 0.05 v/v % to about 5 v/v % by volume of the first aqueous-based fluid.

Element C6: The method wherein the delaying agent is present in the consolidation composition in an amount of from about 0.04 v/v % to about 2 v/v % by volume of the first aqueous-based fluid.

By way of example, Embodiment C may include multiple elements such as: Embodiment C with elements C1, and C2; Embodiment C with elements C1 and C3; Embodiment C with elements C1, C2, C3, C4, C5, and C6; Embodiment C with elements C1, C2, and C3; Embodiment C with elements C1, C2, C3, and C6; etc.

EXAMPLES

The effectiveness of the solution in delaying the rate of the reaction and the performances of the three-component system in providing stability to the consolidated pack were evaluated by experiments. A test apparatus was set up using a 100 mm long brass cell. The brass cell had 300-mesh and 40-mesh screens first placed at the bottom of brass cell, next a short sand layer, 10 grams of material was placed into the bottom of the cell, the sand layer was formed of either 20/40-mesh sand or 12/18-mesh proppant and then a large packing rod was used to tap the sand layer and make it flat. Next, above the sand layer was added mixture of sandpack formed of 48 grams silica flour (specifically SSA-1™ available from Halliburton Energy Services, Inc. of Houston, Tex.), 48 grams of 20/40-mech sand, and 4 grams of bentonite, which has been thoroughly premixed. The sand-pack tapping intermittently after every addition of mixture so that the pack would be uniformly tightened. Finally, a second short sand layer, 10 grams of material was placed into the bottom of the cell, the sand layer was formed of either 20/40-mesh sand or 12/18-mesh proppant and then a large packing rod was used to tap the sand layer and make it flat. Then the top of the cell was fitted with 300-mesh and 40-mesh screens, a cell end, and sealed.

The initial permeability (shown in the table below) was measured by pumping 3% KCl at 5 ml/min and applying a back pressure of 100 Psi at temperature of 150° F.

For control test (without any silence resin) the first step is to take the initial permeability using 3% KCl brine. After the initial permeability measurement, the pack was removed from the cell and subjected to unconfined compressive strength (UCS) analysis. As expected, without the addition of resin, the UCS value was zero.

To test the resin treatment, after measuring the initial permeability using 3% KCl, a desired amount of treatment fluid (6 pore volumes) and post flush fluid (2 pore volumes of 1.5% solution of $NaHCO_3$ (sodium bicarbonate) in 3% KCl solution) was pumped through the sand pack and then the cell was removed from the set up and kept for curing over five days at a desired temperature. Once the curing time was complete, the sand pack was subjected to regain permeability and UCS measurement.

The treatment fluid included a composition of 3 v/v % (3-glycidoxypropyl)trimethoxysilane, 1.58 v/v % N-[3-(trimethyoxysilyl)propyl]ethylenediamine, and 0.4 v/v % trimethylchlorosilane in 3% potassium chloride (KCl) treatment fluid. The final unconfined compressive strength (UCS) was determined as shown in Table 1, below.

TABLE 1

| Curing Temperature | Initial Permeability | Regain Permeability | UCS | Curing Time |
| --- | --- | --- | --- | --- |
| 250° F. | 43 mD | 85% | 291 psi | 5 Days |
| 121° C. | 51 mD | 89% | 128 psi | |
| 100° C. | 45 mD | 83% | 147 psi | |
| 65° C. | 125 | 90% | 225 psi | |
| 40° C. | 20 mD | 93% | 83 psi | |

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:
1. A method comprising:
   injecting an aqueous preflush comprising a first aqueous base fluid, a clay stabilizer, and a surfactant into a portion of a subterranean formation at a matrix flow rate;
   providing a consolidation composition comprising a second aqueous-based fluid, a silane-based resin, a silane-based amine curing agent, and a delaying agent,
   the silane-based resin being an epoxy-functionalized alkoxysilane selected from the group consisting of (3-glycidoxypropyl)trimethoxysilane, (3-glycidoxypropyl)triethoxysilane, 5,6-epoxyhexyltriethoxysilane, (3-glycidoxypropyl)methyldiethoxysilane, (3-glycidoxypropyl)methyldimethoxysilane, and (3-glycidoxypropyl)dimethylethoxysilane,
   the silane-based amine curing agent being selected from the group consisting of N-[3-(trimethoxysilyl)propyl]ethylenediamine, 3-aminopropyltriethoxysilane, 3-aminopropyltrimethoxysilane, 4-aminobutyltriethoxysilane, aminophenyltrimethoxysilane, 3-aminopropyltris(methoxyethoxy-ethoxy)silane, 11-aminodecyltriethoxysilane, 2-(4-pyridylethyl)triethoxysilane, 3-aminopropyl diisopropylethoxysilane, 3-aminopropyl dimethylethoxysilane, N-(2-aminoethyl)-3-aminopropyl-triethoxysilane, N-(6-aminohexyl)aminomethyl-triethoxysilane, N-(6-aminohexyl)aminopropyl-trimethoxysilane, (3-trimethoxysilylpropyl)diethylene triamine, N-butylaminopropyltrimethoxysilane, bis(2-hydroxyethyl)-3-aminopropyl-triethoxysilane, and 3-(N-styrylmethyl-2-aminoethylamino) propyltrimethoxysilane hydrochloride, and any combination thereof; and the delaying agent being selected from the group consisting of methyltrichlorosilane, dimethyldichlorosilane, trimethylchlorosilane, and any combination thereof;

injecting the consolidation composition into the portion of the subterranean formation at a matrix flow rate;

injecting an aqueous postflush fluid comprising a third aqueous base fluid and an alkaline agent into the portion of the subterranean formation at a matrix flow rate; and curing the consolidation composition so as to consolidate coated proppant particulates in a fracture and form a proppant pack therein.

2. The method of claim 1 wherein the alkaline agent comprises a material selected from the group consisting of sodium bicarbonate, sodium hydroxide, and combinations thereof.

3. The method of claim 1 wherein the alkaline agent is present in the aqueous postflush fluid in an amount of from about 0.1% to about 5% by weight of the third aqueous base fluid.

4. The method of claim 1 wherein the silane-based resin is present in the consolidation composition in an amount of from about 0.1% to about 7.5% by volume of the second aqueous-based fluid.

5. The method of claim 1 wherein the silane-based amine curing agent is present in the consolidation composition in an amount of from about 0.05% to about 5% by volume of the second aqueous-based fluid.

6. The method of claim 1 wherein the delaying agent is present in the consolidation composition in an amount of from about 0.04% to about 2% by volume of the second aqueous-based fluid.

7. A method comprising:
providing a consolidation composition comprising a first aqueous-based fluid, a silane-based resin, a silane-based amine curing agent, and a delaying agent,
the silane-based resin being an epoxy-functionalized alkoxysilane selected from the group consisting of (3-glycidoxypropyl)trimethoxysilane, (3-glycidoxypropyl)triethoxysilane, 5,6-epoxyhexyltriethoxysilane, (3-glycidoxypropyl)methyldiethoxysilane, (3-glycidoxypropyl)methyldimethoxysilane, and (3-glycidoxypropyl)dimethylethoxysilane,
the silane-based amine curing agent being selected from the group consisting of N-[3-(trimethoxysilyl)propyl]ethylenediamine, 3-aminopropyltriethoxysilane, 3-aminopropyltrimethoxysilane, 4-aminobutyltriethoxysilane, aminophenyltrimethoxysilane, 3-aminopropyltris(methoxyethoxy-ethoxy)silane, 11-aminodecyltriethoxysilane, 2-(4-pyridylethyl)triethoxysilane, 3-aminopropyl diisopropylethoxysilane, 3-aminopropyl dimethylethoxysilane, N-(2-aminoethyl)-3-aminopropyl-triethoxysilane, N-(6-aminohexyl)aminomethyl-triethoxysilane, N-(6-aminohexyl)aminopropyl-trimethoxysilane, (3-trimethoxysilylpropyl)diethylene triamine, N-butylaminopropyltrimethoxysilane, bis(2-hydroxyethyl)-3-aminopropyl-triethoxysilane, and 3-(N-styrylmethyl-2-aminoethylamino)propyltrimethoxysilane hydrochloride, and any combination thereof; and
the delaying agent being selected from the group consisting of methyltrichlorosilane, dimethyldichlorosilane, trimethylchlorosilane, and any combination thereof; and injecting the consolidation composition comprising the silane-based resin into a portion of a subterranean formation at a matrix flow rate.

8. The method of claim 7 further comprising injecting an alkaline agent at a matrix flow rate into the portion of the subterranean formation after injecting the consolidation composition comprising the silane-based resin into the portion of the subterranean formation.

9. The method of claim 8 wherein the alkaline agent comprises a material selected from the group consisting of sodium bicarbonate, sodium hydroxide, and combinations thereof.

10. The method of claim 8 wherein the alkaline agent is present in an aqueous postflush fluid in an amount of from about 0.1% to about 5% by weight of a third aqueous base fluid.

11. The method of claim 7 wherein the silane-based resin is present in the consolidation composition in an amount of from about 0.1% to about 7.5% by volume of the first aqueous-based fluid.

12. The method of claim 7 wherein the silane-based amine curing agent is present in the consolidation composition in an amount of from about 0.05% to about 5% by volume of the first aqueous-based fluid.

13. The method of claim 7 wherein the delaying agent is present in the consolidation composition in an amount of from about 0.04% to about 2% by volume of the first aqueous-based fluid.

14. A method comprising:
providing proppant particulates;
providing a consolidation composition comprising a first aqueous-based fluid, a silane-based resin, a silane-based amine curing agent, and a delaying agent,
the silane-based resin being an epoxy-functionalized alkoxysilane selected from the group consisting of (3-glycidoxypropyl)trimethoxysilane, (3-glycidoxypropyl)triethoxysilane, 5,6-epoxyhexyltriethoxysilane, (3-glycidoxypropyl)methyldiethoxysilane, (3-glycidoxypropyl)methyldimethoxysilane, and (3-glycidoxypropyl)dimethylethoxysilane,
the silane-based amine curing agent being selected from the group consisting of N-[3-(trimethoxysilyl)propyl]ethylenediamine, 3-aminopropyltriethoxysilane, 3-aminopropyltrimethoxysilane, 4-aminobutyltriethoxysilane, aminophenyltrimethoxysilane, 3-aminopropyltris(methoxyethoxy-ethoxy)silane, 11-aminodecyltriethoxysilane, 2-(4-pyridylethyl)triethoxysilane, 3-aminopropyl diisopropylethoxysilane, 3-aminopropyl dimethylethoxysilane, N-(2-aminoethyl)-3-aminopropyl-triethoxysilane, N-(6-aminohexyl)aminomethyl-triethoxysilane, N-(6-aminohexyl)aminopropyl-trimethoxysilane, (3-trimethoxysilylpropyl)diethylene triamine, N-butylaminopropyltrimethoxysilane, bis(2-hydroxyethyl)-3-aminopropyl-triethoxysilane, and 3-(N-styrylmethyl-2-aminoethylamino)propyltrimethoxysilane hydrochloride, and any combination thereof; and
the delaying agent being selected from the group consisting of methyltrichlorosilane, dimethyldichlorosilane, trimethylchlorosilane, and any combination thereof;
coating the proppant particulates with the consolidation composition, thereby creating coated proppant particulates;
introducing the coated proppant particulates into a subterranean formation and placing the coated proppant particulates into a fracture therein; and curing the consolidation composition so as to consolidate the coated proppant particulates in the fracture and form a proppant pack therein.

15. The method of claim 14, wherein the step of curing the consolidation composition is performed by washing an aqueous postflush fluid comprising an aqueous base fluid and an alkaline agent across the coated proppant particulates.

16. The method of claim 15 wherein the alkaline agent comprises a material selected from the group consisting of sodium bicarbonate, sodium hydroxide, and combinations thereof.

17. The method of claim 15 wherein the alkaline agent is present in the aqueous postflush fluid in an amount of from about 0.1% to about 5% by weight of the aqueous postflush fluid.

18. The method of claim 14 wherein the silane-based resin is present in the consolidation composition in an amount of from about 0.1% to about 7.5% by volume of the first aqueous-based fluid.

19. The method of claim 14 wherein the silane-based amine curing agent is present in the consolidation composition in an amount of from about 0.05% to about 5% by volume of the first aqueous-based fluid.

20. The method of claim 14 wherein the delaying agent is present in the consolidation composition in an amount of from about 0.04% to about 2% by volume of the first aqueous-based fluid.

* * * * *